(12) United States Patent
Takano et al.

(10) Patent No.: US 8,943,692 B2
(45) Date of Patent: Feb. 3, 2015

(54) CONDUCTIVE ROLLER AND MANUFACTURING METHOD THEREFOR

(75) Inventors: Junichi Takano, Yokohama (JP); Izumi Yoshimura, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 175 days.

(21) Appl. No.: 13/582,191

(22) PCT Filed: Mar. 1, 2011

(86) PCT No.: PCT/JP2011/054649
§ 371 (c)(1),
(2), (4) Date: Aug. 31, 2012

(87) PCT Pub. No.: WO2011/108547
PCT Pub. Date: Sep. 9, 2011

(65) Prior Publication Data
US 2012/0322637 A1      Dec. 20, 2012

(30) Foreign Application Priority Data

Mar. 1, 2010   (JP) ................................ 2010-044654

(51) Int. Cl.
*B21K 1/02*       (2006.01)
*F16C 13/00*    (2006.01)
(Continued)

(52) U.S. Cl.
CPC .......... *G03G 15/0233* (2013.01); *C08J 9/0066* (2013.01); *G03G 15/0818* (2013.01); *G03G 15/1685* (2013.01); *G03G 21/0058* (2013.01); *C08J 2375/04* (2013.01)
USPC ........ 29/895.32; 29/895.3; 29/527.2; 492/48; 492/49; 492/53; 492/56

(58) Field of Classification Search
CPC ............... F16C 13/00; B29L 2031/326; B29L 2031/324; G03G 15/0233; G03G 15/0818; G03G 21/0058; G03G 15/1685; G03G 2215/0861
USPC ................. 492/18, 30, 48, 49, 53, 56, 59, 60; 29/895, 895.3, 895.32, 527.1, 527.2; 427/498, 512; 399/176, 286
See application file for complete search history.

(56) References Cited

U.S. PATENT DOCUMENTS 4,452,819 A  *  6/1984  Inoue et al. ................... 427/512
5,497,219 A  *  3/1996  Kurokawa et al. ............ 399/176

FOREIGN PATENT DOCUMENTS

JP     10159834 A   *   6/1998  .............. F16C 13/00
JP     11-294446 A       10/1999
(Continued)

OTHER PUBLICATIONS
English Machine Translation JP 10159834A.*
(Continued)

*Primary Examiner* — Sarang Afzali
(74) *Attorney, Agent, or Firm* — Sughrue Mion, PLLC (57) ABSTRACT

Provided is a conductive roller including a shaft 1, and an elastic layer 2 and a surface layer 3 formed on the periphery of the shaft in the order mentioned. The elastic layer 2 is composed of a polyurethane foam containing a polyurethane resin and a waterproofing agent. By containing the waterproofing agent in the formulation of the polyurethane foam constituting the elastic layer 2, the environment-dependence of the roller resistance is improved, the resistance variance accompanied by change in the environment can be controlled, and pores formed on the surface of the elastic layer 2 are made fine, whereby the surface properties of the roller improve. Also provided is a method of manufacturing the above-mentioned conductive roller.

4 Claims, 5 Drawing Sheets

(51) Int. Cl.
  *G03G 15/02* (2006.01)
  *C08J 9/00* (2006.01)
  *G03G 15/08* (2006.01)
  *G03G 15/16* (2006.01)
  *G03G 21/00* (2006.01)

(56) References Cited

FOREIGN PATENT DOCUMENTS

| JP | 200149194 A | 2/2001 |
| JP | 2002-361142 A | 12/2002 |
| JP | 2004-59655 A | 2/2004 |
| JP | 200945759 A | 3/2009 |

OTHER PUBLICATIONS

English Machine Translation JP 2004059655A.*
English Machine Translation JP 2002361142A.*
International Search Report for PCT/JP2011/054649 dated Apr. 12, 2011.
Communication dated Jul. 22, 2014 from the Japanese Patent Office in counterpart Japanese Patent Application No. 2010-044654.

* cited by examiner

CONDUCTIVE ROLLER AND MANUFACTURING METHOD THEREFOR

TECHNICAL FIELD

The present invention relates to a conductive roller and a manufacturing method therefor (hereinafter, also simply referred to as "roller" and "manufacturing method", respectively), and more particularly, to a conductive roller used in an image forming apparatus using a xerography, and a manufacturing method therefor.

BACKGROUND ART

Generally, in an image forming apparatus using a xerography such as a copier, a printer or a facsimile, in the image forming steps, a roller to which a conductivity is imparted such as a transfer roller, a developing roller, a toner supply roller, a charging roller, a cleaning roller, an intermediate transfer roller or a belt driving roller is used.

As such roller members, ones provided with a basic structure having an elastic layer comprising rubber, polymeric elastomer, polymeric foam or the like to which an electric conductivity is imparted by blending a conductive agent therein, which elastic layer is formed on the outer periphery of the shaft; and further with a single or multiple coating layers on the outer periphery of the layer to attain a desired surface roughness, conductivity, hardness and the like; have been conventionally used.

As the technique related to a conductive roller, for example, Patent Document 1 discloses a technique in which a metal plating layer is provided on the outer surface and the inner surface of an elastic resin roller portion in a conductive roller provided with a shaft and a continuously foamed elastic resin roller portion which is bonded to the periphery surface of the shaft excepting at least one of the exposed ends of the shaft via an adhesion layer, for the purpose of obtaining a conductive roller having an elasticity and provided with an intermediate resistance of about $10^3\Omega$ to $10^6\Omega$ with small resistance variability.

RELATED ART DOCUMENTS

Patent Documents

Patent Document 1: Japanese Unexamined Patent Application Publication No. 11-294446 (Claims and the like)

SUMMARY OF THE INVENTION

Problems to be Solved by the Invention

In the conductive roller including an elastic layer composed of a foam body, however, there has been a problem in that the resistance variation under a high temperature and a high humidity environment is wide and the resistance value under a normal temperature environment and a normal humidity is widely different from the resistance value under a high temperature and a high humidity environment. When an elastic layer composed of a foam body is manufactured by free foaming, pores are formed on the surface of the elastic layer. When the pore size is large, in the case of forming another layer on the elastic layer by coating, a coating soaks into the pores and there may arise unevenness on the surface of the finally obtained roller. Although it is preferable that the pore size on the surface of the elastic layer be fine, it has thus been difficult to adjust the pore size as desired by a free foaming method.

Accordingly, an object of the present invention is to overcome the above-mentioned problem and to provide a conductive roller whose resistance has a small environment-dependence, on the surface of the elastic layer of which the pore size is fine and the surface properties are excellent, and a manufacturing method therefor.

Means for Solving the Problem

The present inventor intensively studied to discover that the above-mentioned problem can be resolved by adding a waterproofing agent to the composition of a foam body constituting an elastic layer, thereby completing the present invention.

The conductive roller of the present invention is a conductive roller comprising a shaft, and an elastic layer and a surface layer formed on the periphery of the shaft in the order mentioned, wherein
the elastic layer is composed of a polyurethane foam containing a polyurethane resin and a waterproofing agent.

In the present invention, as the waterproofing agent, ammonium zirconium carbonate is preferably used. The polyurethane foam preferably contains 0.5 to 20 parts by mass of the waterproofing agent with respect to 100 parts by mass of the polyurethane resin. The conductive roller of the present invention is preferably used as a conductive roller is a charging roller.

The manufacturing method of a conductive roller of the present invention is a manufacturing method of the conductive roller of the present invention, wherein,
after foaming materials to be added containing the polyurethane resin and waterproofing agent, the foamed materials to be added is applied to the shaft by dipping coating and the elastic layer is formed on the periphery of the shaft.

Effect of the Invention

In the present invention, by containing a waterproofing agent in the formulation of the polyurethane foam constituting an elastic layer, it becomes possible to attain a conductive roller whose resistance has a small environment-dependence, on the surface of the elastic layer of which the pore size is fine and the surface properties are excellent, and a manufacturing method therefor.

MODES FOR CARRYING OUT THE INVENTION

An embodiment of the present invention will be described in detail with reference to the drawings.

Figure 1:
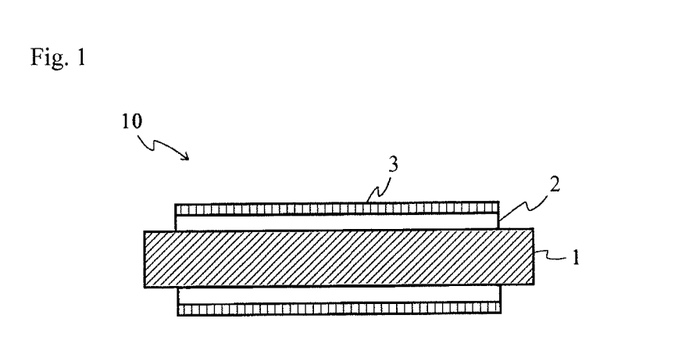
FIG. 1 is a cross-sectional view illustrating one example of a conductive roller of the present invention in the length direction.

FIG. 1 is a cross-sectional view illustrating one example of a conductive roller of the present invention in the length direction. As illustrated, a conductive roller 10 of the present invention comprises a shaft 1, and an elastic layer 2 and a surface layer 3 formed on the periphery of the shaft in the order mentioned.

The present invention is characterized in that an elastic layer 2 is composed of a polyurethane foam containing a polyurethane resin and a waterproofing agent. By containing the waterproofing agent in the formulation of the polyurethane foam constituting the elastic layer 2, the environment-dependence of the roller resistance is improved and the resistance variance accompanied by change in the environment can be controlled, as well as pores formed on the surface of the elastic layer 2 are made fine, whereby the surface properties of the roller improve.

In the present invention, as the waterproofing agent, for example, ammonium zirconium carbonate can be preferably used. In the present invention, the reason why the above-mentioned effect is obtained by adding such a waterproofing agent into the elastic layer 2 is thought to be that a new charge path is formed in the foam by forming a hydrogen bond between an OH group in the polyurethane resin and a carboxyl group in the waterproofing agent such as zirconium ammonium carbonate. As the result, a roller in which the electric resistance of the foam can be reduced, the resistance variation with respect to change in the environment is inhibited and the environment-dependence of the resistance is small can be obtained. Since when the waterproofing agent accelerates crosslinking in the vicinity of the surface of the elastic layer 2, the pores on the surface close, whereby the effect of decrease in the pore size can be obtained. As such a waterproofing agent composed of ammonium zirconium carbonate, for example, AZ Coat 5800MT manufactured by SAN NOPCO LIMITED can be preferably used.

In the polyurethane foam constituting the elastic layer 2, the amount of the waterproofing agent to be added is preferably 0.5 to 20 parts by mass, particularly 0.5 to 5 parts by mass with respect to 100 parts by mass of the polyurethane resin. When the amount of the waterproofing agent to be added is too large, the viscosity becomes too high and the pot life tends to be reduced; on the other hand, when the amount of the waterproofing agent to be added is too small, a desired effect of the present invention may not be sufficiently obtained, both of which are not preferred.

In the present invention, it is important only that a waterproofing agent is contained in a polyurethane foam constituting the elastic layer 2 of the conductive roller. In other respects, the roller can be constituted according to an usual method as appropriate, and the method is not particularly restricted. For example, as the polyurethane resin used for the above-mentioned polyurethane foam, a conventionally known material can be appropriately selected and used, and is not particularly restricted. The expansion ratio of the polyurethane foam is not particularly restricted and preferably 1.2 to 50 times, particularly 1.5 to 10 times, and the foam density is preferably 0.1 to 0.7 g/cm$^3$.

To the elastic layer 2, a conductive agent can be added. By this, the conductivity is imparted to the layer, or the conductivity is adjusted to obtain a predetermined resistance value. Such a conductive agent is not particularly restricted, and examples thereof include cationic surfactants such as quaternary ammonium salts such as perchlorates, chlorates, fluoroborates, sulphates, ethosulfates and benzyl halides such as benzyl bromides, benzyl chlorides of lauryltrimethyl ammonium, stearylmethyl ammonium, octadodecyl trimethyl ammonium, hexadecyl trimethyl ammonium, trans fatty acid-.dimethyl ethyl ammonium; anionic surfactants such as fatty series sulfonic acid salts, higher alcohol sulfate ester salts, higher alcohol ethylene oxide adduct sulfate ester salts, higher alcohol phosphate ester salts, higher alcohol ethylene oxide adduct phosphate ester salts; antistatic agents such as nonionic antistatic agents such as higher alcohol ethylene oxides, polyethylene glycol fatty acid esters, polyalcohol fatty acid esters; electrolytes such as salts of group 1 metals in periodic table such as $Li^+$, $Na^+$, $K^+$ such as $NaClO_4$, $LiAsF_6$, $LiBF_4$, NaSCN, KSCN, NaCl, or salts of $NH_4^+$; or electroconductive carbons such as ketjen black and acetylene black; carbons for rubber such as SAF, ISAF, HAF, FEF, GPF, SRF, FT and MT; oxidation-treated carbons for color (ink); pyrolytic carbons; natural graphite; artificial graphite; metals and metal oxides such as antimony-doped tin oxides, titanium oxides, zinc oxides, nickel, copper, silver, and germanium; electroconductive polymers such as polyaniline, polypyrrole and polyacetylene. These conductive agents may be used alone or two or more of these may be mixed and used. The amount of such conductive agents to be added is appropriately selected depending on the type of the composition, and usually adjusted such that the volume resistivity of the elastic layer 2 is $10^0$ to $10^8$ Ω·cm, preferably $10^2$ to $10^6$ Ω·cm.

To the elastic layer 2, other than the above-mentioned conductive agents, a known additive such as a wetting agent, a foaming agent, a foam stabilizer, a curing agent, a thickener, a defoamer, a leveling agent, a dispersing agent, a thixotropic agent, an antiblocking agent, a crosslinker or a film formation aid can be added in an appropriate amount, as required. Among these, as the wetting agent, for example, a silicone surfactant such as a polyether-modified silicone can be favorably used. The polyether-modified silicone has a structure in which a part of alkyl group in poly(dialkylsiloxane) is replaced by a substitute having a polyoxyalkylene group. Examples of such a polyether-modified silicone include dimethylpolysiloxane polyoxyalkylene copolymer. By containing a wetting agent in the elastic layer 2, a leveling effect which is the intrinsic effect of the wetting agent can be obtained, as well as, coarsening of the foaming cell can be inhibited and the foam size can be made fine. In addition, foaming amount of the coating at free foaming can be more precisely controlled. The amount of such a wetting agent to be added is preferably 0.1 to 2 parts by mass with respect to 100 parts by mass of polyurethane resin. When the amount of the wetting agent to be added is too large, gelation of the coating tends to occur; on the other hand, when the amount of the wetting agent to be added is too small, a desired effect may not be sufficiently obtained, both of which are not preferred.

The thickness of the elastic layer 2 is preferably 0.6 to 5.0 mm, and more preferably 1.0 to 3.0 mm. By making the thickness of the elastic layer 2 in the above range, a spark discharge can be prevented.

In the present invention, as the shaft 1, a hollow cylinder or solid cylinder made of metal or plastics can be used, and preferably a hollow cylinder or solid cylinder made of metal, and more preferably a hollow cylinder made of metal can be used. By using this, the cost can be reduced.

In the present invention, the surface layer 3 provided on the elastic layer 2 is preferably formed by using a water-based coating. For a water-based coating used for such a surface layer 3, rubber or a resin which is known as a material for a roller or the like can be employed. Examples of the resin include a urethane-modified acrylic resin, polyurethane resin, acrylic resin, acrylic silicone resin, polyamide resin and fluorocarbon resin, and one or more of these can be mixed to be used. As the water-based rubber coating, latex such as natural rubber (NR), chloroprene rubber (CR), nitrile rubber (NBR), styrene butadiene rubber (SBR) can be preferably used; as the water-based polyurethane resin coating, an ether or ester emulsion or dispersion can be preferably used; as the water-based acrylic resin coating, emulsion such as acrylic, acrylic styrene can be preferably used; and as the water-based fluorocarbon resin coating, polytetrafluoroethylene, tetrafluoroethylene-perfluoroalkylvinylether copolymer, tetrafluoroethylene-ethylene copolymer, polychlorotrifluoroethylene, chlorotrifluoroethylene-ethylene copolymer, tetrafluoroethylene-vinylidenefluoride copolymer, polyvinylidene fluoride, polyvinyl fluoride can be preferably used.

In the present invention, among the above, as the water-based coating, a water-based acrylic resin can be preferably used. As such a water-based acrylic resin, a resin having as an essential component acrylonitrile and n-butyl acrylate and optionally containing other monomers is preferred. Examples of the other monomer include ethyl acrylate, acrylic acid 2-ethyl hexyl, acrylic acid and methacrylic acid. The resin contains as the essential component acrylonitrile and n-butyl acrylate because these serve as the improvement of the elasticity (setting properties). From this point of view, the amount of n-butyl acrylate is increased as much as possible and the amount of the other components is reduced, as well as the monomer ratio of monomer components other than the essential components is preferably reduced. On the other hand, when the ratio of acrylonitrile is increased, the formed layer becomes hard, which is not preferable. The monomer ratio of acrylonitrile and n-butyl acrylate which are essential components is therefore 1 to 25:99 to 75 based on the molar ratio, and particularly preferably in a range of 5 to 20:95 to 80.

The above-mentioned water-based acrylic resin preferably contains a group having an active hydrogen in the molecule. Examples of the group having an active hydrogen includes a carboxyl group, a hydroxy group and an amino group, and are preferably a carboxyl group. In the present invention, the ratio of monomers containing a group having such an active hydrogen is preferably in a range of 3 to 6% of the whole amount of the monomers. In the present invention, by setting the ratio of the monomer containing the group having an active hydrogen in this range, a water-based acrylic resin whose surface acid value is adjusted to 10 mg/g or higher, for example, 10 to 20 mg/g can be favorably used.

To the water-based coating which forms the above-mentioned surface layer 3, a conductive agent is added, which is not restrictive, whereby the conductivity (electric resistance) is imparted to the surface layer 3 or the conductivity can be adjusted. The conductive agent used in this case is not particularly restricted, and the same agents used for the elastic layer 2 can be appropriately used alone or two or more of these can be used in mixture. The amount of these conductive agents added is appropriately selected depending on the types of the composition, and usually, the volume resistivity of the surface layer 2 is adjusted to $1 \times 10^4$ to $1 \times 10^{12}$ Ω·cm, preferably $1 \times 10^6$ to $1 \times 10^8$ Ω·cm.

To the water-based coating which forms this surface layer 3, an additive such as a cross linking agent, a thickener, a thixotropic agent or a structural viscosity agent may be added as required.

The thickness of the surface layer 3 is not particularly restricted thereto, and may be set to usually 1 to 30 µm, particularly 1 to 20 µm. If the thickness is smaller than 1 µm, the durability of the roller is sometimes poor, and on the other hand, if the thickness is larger than 30 µm, there are cases where a good surface quality may not be obtained such as a case where electrification characteristics or the like is negatively affected and a case where wrinkle occurs on the surface.

Figure 2:
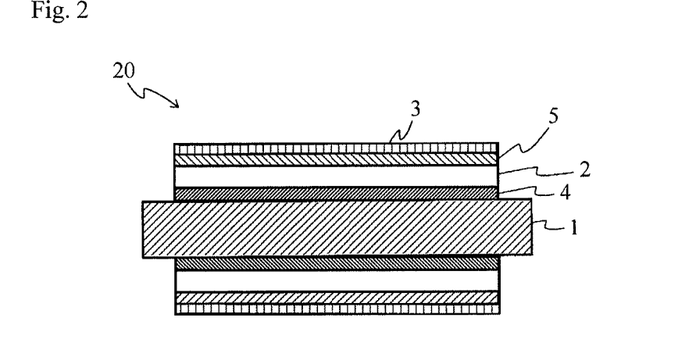
FIG. 2 is a cross-sectional view illustrating another example of a conductive roller of the present invention in the length direction.

A conductive roller 10 of the present invention at least comprises the surface layer 3 on the above-mentioned elastic layer 2. As required, between the elastic layer 2 and the surface layer 3, a resistance adjusting layer 5 can be provided as an intermediate layer; and further, between the elastic layer 2 and the resistance adjusting layer 5, an adhesion layer 4 can be placed. Further, by providing an adhesion layer 4 on the periphery of a shaft 1 prior to the formation of the elastic layer 2, the adhesiveness between the shaft 1 and the elastic layer 2 can be improved. FIG. 2 is a cross-sectional view illustrating another configuration example of a conductive roller of the present invention. A conductive roller 20 as illustrated comprises the shaft 1, and the adhesion layer 4, the elastic layer 2, the resistance adjusting layer 5 and the surface layer 3 which are formed on the periphery of the shaft 1 in the order mentioned.

The above-mentioned resistance adjusting layer 5 can be formed by a resin composition in which a conductive agent is added to the resin. The resin which constitutes this resin composition is not particularly restricted, and examples thereof include urethane resin, acrylic urethane resin, acrylic resin, ester resin, nylon resin, phenolic resin, epoxy resin, fluorocarbon resin and silicone resin. One of these may be used, or two or more of these may be used in mixture. Among these, a water-based coating such as urethane resin, acrylic urethane resin, acrylic resin is preferably used. As the conductive agent which is added to this water-based coating, the same conductive agent as used in the above-mentioned elastic layer 2 can be used.

The resistance adjusting layer 5 is optionally provided in order to adjust the electric resistance value of the conductive roller. The resistance value of the resistance adjusting layer 5 is appropriately set depending on the resistance value of the above-mentioned elastic layer 2 or the resistance value needed for the roller, and may be usually in a range of $1 \times 10^3$ to $1 \times 10^8$ Ω·cm, and particularly $1 \times 10^5$ to $1 \times 10^7$ Ω·cm. In this case, the amount of the above-mentioned conductive agent to be added may be an amount in which this resistance value is attained, and is usually 0.1 to 20 parts by mass, particularly 1 to 10 parts by mass with respect to 100 parts by mass of the base resin of the above-mentioned water-based coating.

To the above-mentioned resistance adjusting layer 5, a variety of additives other than the conductive agents can be added without departing from an object of the present invention. For example, a crosslinker such as one based on oxazoline, epoxy, melamine, guanamine, isocyanate or phenol can be added in an appropriate amount depending on the base resin to be used. Other known additives such as a film formation aid, a dispersing agent, a thickener, a leveling agent, a thixotropic agent and a structural viscosity agent may be added in an appropriate amount.

The thickness of the resistance adjusting layer 5 is appropriately selected depending on the thickness of the elastic layer 2 or the shape of the conductive roller or the like, and not particularly restricted. The thickness is preferably usually 10 to 500 µm, and particularly 50 to 300 µm. When the thickness of the resistance adjusting layer 5 is smaller than 50 µm, it sometimes becomes difficult to sufficiently adjust the resistance value. On the other hand, when the thickness of the resistance adjusting layer 5 is larger than 300 µm, the thickness of the elastic layer becomes relatively small, whereby the hardness of the roller (hardness of a member) sometimes becomes high or the cost sometimes becomes higher than necessary.

The adhesion layer 4 can be optionally provided in order to strongly bond between the shaft 1 and the elastic layer 2, or between the elastic layer 2 and the resistance adjusting layer 5, and the thickness thereof may be about 1 to 100 µm. The adhesion layer 4 can by formed, for example, by using a resin material such as acrylic resin, urethane resin, acrylic urethane resin, polyester resin or polyamide resin.

Figure 3:
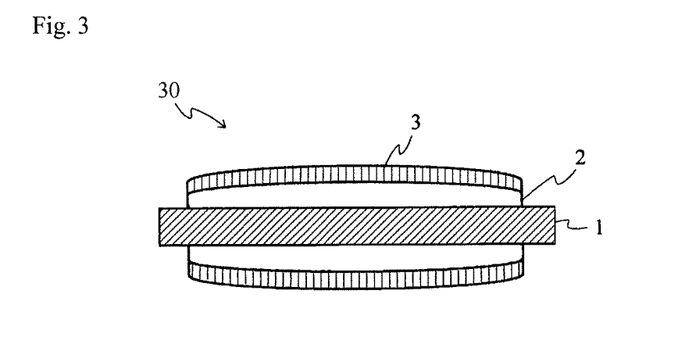
FIG. 3 is a cross-sectional view illustrating still another example of a conductive roller of the present invention in the length direction.

FIG. 3 is a cross-sectional view in the length direction illustrating still another example of a conductive roller of the present invention. In cases where the conductive roller is used as a charging roller or the like, since it is important that a uniform working face be formed in the longitudinal direction when the conductive roller is pressed on the photoconductor drum, the illustrated conductive roller 30 of the preferred embodiment has a crown shape whose diameter at the center portion is larger than those at the end portions.

In cases where the conductive roller is made into a crown shape, as a crown amount which represents the degree of the protrusion when the portion at the center is more protruded than the portions at the ends in the roller length direction in the cross section of the roller length direction, 50 to 300 µm is preferably employed. By employing this amount, normal images may be made more preferable. If the crown amount is smaller than 50 µm, the contact pressure at the center of the roller in the roller length direction becomes low, while if the crown amount is larger than 300 µm, the portion at the center of the roller in the roller length direction makes too strong contact. Both cases possibly cause a failure such as ununiformity of the charge amount. The measurement of the crown amount of the conductive roller of the present invention can be performed by using High Precision Laser Measuring Machine LSM-430v manufactured by Mitutoyo Corporation. External diameters at the center portion and at 90 mm from the center portion in the direction from the center portion to the end portion were measured by this measuring machine, and a roller crown amount is defined as the difference between the external diameter at the center portion and the average of the external diameters at 90 mm from the center portion in the directions from the center portion to the end portions. For example, for a conductive roller having a roller length of 250 mm, external diameters are measured at three point, at 35 mm, 125 mm and 215 mm from one end of the roller. In this case, the crown amount (µm) is calculated by the following formula (1):

$$\text{Crown amount (µm)} = \{B - (A+C)/2\} \times 1000 \quad (1),$$

where the external diameter at 35 mm from one end of the roller is A (mm), the external diameter at 125 mm from one end of the roller is B (mm) and the external diameter at 215 mm from one end of the roller is C (mm).

The conductive rollers of the present invention preferably have a deviation (precision of film thickness) of not larger than 70 µm in the whole range in the roller length direction. In cases where the conductive rollers are used as an electrifying roller and allowed to be revolved while being in contact with the photoreceptor, when the deviation of the conductive rollers is large, a gap between the conductive roller and the photoreceptor is generated and further, the gap distance varies. In this case, toner particles and external additives which remain on the photoreceptor are likely to intrude into the gap and then attached irregularly on the conductive rollers. As a result, the surface of the roller becomes mottled with the remain, which produces an image with a low quality. It is noted that the measurement of the deviation of the conductive rollers of the present invention can be performed by using High Precision Laser Measuring Machine LSM-430v manufactured by Mitutoyo Corporation. The external diameters for five points in the roller length direction are measured by this measuring machine, and a deviation is defined as the average of the differences between the maximum value and the minimum value of the measured external diameter for individual points.

The conductive roller of the present invention can be favorably used particularly as a charging roller.

The conductive roller of the present invention can be manufactured as described in the following. First, to polyurethane resin constituting the elastic layer 2, a waterproofing agent and other optional additives are added, and the obtained materials to be added are allowed to be foamed by stirring with a stirrer such as a hand-mixer. Thereafter, the foamed materials to be added are applied to the shaft 1 by dipping coating to form the elastic layer 2 on the periphery of the shaft 1. By forming the elastic layer 2 by applying a coating directly to the shaft 1, the manufacturing steps can be simplified and the cost can be reduced.

Next, the adhesion layer 4 is optionally formed by applying a coating in which the above-mentioned components are dispersed or dissolved. As the coating method, known methods such as a dipping method, a spray method, a roll coater method, a die coating method and a ring coating method can be appropriately used. After a coating is applied, the coating is solidified by drying to form the adhesion layer 4. As the coating method, among these, a dipping method is preferably used. Also in cases where the adhesion layer 4 is provided between the shaft 1 and the elastic layer 2, the same method as described above can be used. The resistance adjusting layer 5 also can be optionally formed in the same manner as used for the adhesion layer 4.

Further, by forming the surface layer 3 by applying a coating on the above-mentioned elastic layer 2 or on the resistance adjusting layer 5 formed on the elastic layer 2 in the same method as used for the above-mentioned adhesion layer 4, the conductive roller of the present invention can be obtained. In the present invention, since the pore size on the surface of the elastic layer 2 is made fine, a coating will not intrude into the pores when the surface layer 3 or the like is formed by applying on the elastic layer 2, and an effect is obtained which does not compromise the surface properties of the finally obtained conductive roller.

EXAMPLES

The present invention will now be described in detail by way of Examples.

A conductive roller having a structure as illustrated in FIG. 1 in which an elastic layer 2 and a surface layer 3 were formed on the periphery of a shaft 1 in the order mentioned was manufactured in the manner as described in the following according to the formulation given in the Table below.

First, to 100 parts by mass of water-based coating (a water emulsion of acrylonitrile-acrylic acid alkyl ester-methacrylic acid-methacrylic acid glycidyl copolymer), 5 parts by mass of EPOCROS (emulsion of oxazoline group containing styrene-acrylic copolymer), 10 parts by mass of water dispersion carbon, 7.5 parts by mass of Fineseal X-12 (hydrophilic silica), 1 parts by mass of SN Defoamer 777 (defoamer), 1 parts by mass of SN Wet 970 (wetting agent), 1.6% by mass of UH420 (thickener) were added to be stirred by a stirrer. The water-based coating to which all of the ingredients were added was filtrated by a mesh to remove aggregate. The shaft 1 was subjected to a dipping coating with this water-based coating and to heat drying, thereby forming an adhesion layer 4 having a thickness of 100 μm on the periphery of the shaft 1. Next, the materials to be added of the elastic layer each given in the Table below were injected in a container to be stirred for 30 minutes by using a blade. Then, the resultant was stirred for six minutes by using a commercially available hand-mixer to be foamed, thereby obtaining an aqueous urethane foam dispersion.

The above-mentioned aqueous urethane foam dispersion was applied by dipping coating on the periphery of the shaft 1 on which the adhesion layer 4 was formed, dried and hardened in a heat oven, whereby the elastic layers 2 composed of polyurethane foams individually having the thicknesses given in the Table below.

Next, to 100 parts by mass of a water-based coating (acrylic silicon resin, EX102SI, manufactured by NIPPON SHOKUBAI CO., LTD.), 70 parts by mass of 2,2,4-trimethyl-1,3-pentanediol monoisobutylate (manufactured by Chisso Corporation, CS-12), 8 parts by mass of aqueous silicone graft acrylic polymer (manufactured by Toagosei Co., Ltd., Symac US-450), 27 parts by mass of polyether modified polydimethyl siloxane (manufactured by BYK Japan KK, BYK-333), 2 parts by mass of a fluorine containing nonionic surfactant (manufactured by Neos COMPANY LIMITED, Ftergent 215M) and 10 parts by mass of SILICA (manufactured by TOKUYAMA corporation, FINE SEAL X-12), 15 parts by mass of Nylon particles (manufactured by GANZ CHEMICAL CO., LTD, GANZ PEARL GPA-550), 10 parts by mass of aqueous dispersion of a black organic pigment (BONJET BLACK CW-3 (manufactured by ORIENT CHEMICAL INDUSTRIES CO., LTD.) were added to be stirred by a stirrer. The obtained water-based coating was applied on the above-mentioned elastic layer 2 by dipping coating and dried for 30 minutes at room temperature and for 20 minutes at 110° C. to form the surface layer 3 having a thickness of 5 μm, thereby obtaining each conductive roller.

For each of the obtained rollers, the resistances were measured under three conditions of a normal temperature and a normal humidity environment, a low temperature and a low humidity environment and a high temperature and a high humidity environment. Specifically, each roller was left to stand in a controlled space for 24 hours under the normal temperature and the normal humidity at a room temperature of 23° C. and a humidity of 55%, under the low temperature and the low humidity of 10° C. and a humidity of 15% or under the high temperature and the high humidity at a room temperature of 30° C. and a humidity of 85%, then the resistances were measured. From these measured resistance values, a reaction width (the reaction width={the maximum value of the resistance (under a low temperature and a low humidity)–the minimum value of the resistance (under a high temperature and a high humidity)}/the minimum value of the resistance) was determined. For each roller, the vicinity of the surface of the elastic layer before the formation of the surface layer 3 was cut in a thickness of about 3 mm. Then, the diameters of the pores were measured by using DIGITAL MICROSCOPE (VHX-100, manufactured by KEYENCE CORPORATION) at ten points in descending order to be averaged. The measured results of these resistance values and the averaged pore sizes are given in the Table below. The photographs of the pores on the surface of the elastic layers are illustrated in FIGS. 4 to 10.

TABLE 1

Figure 4:
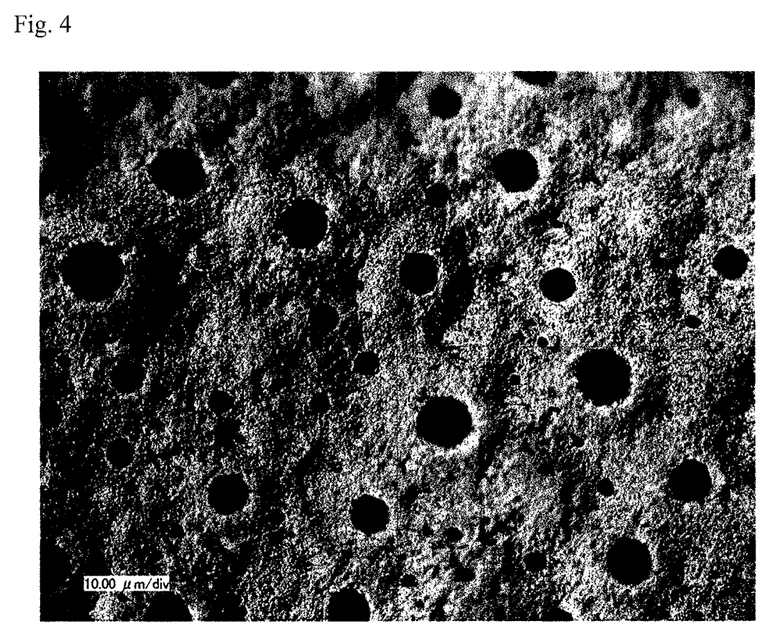
FIG. 4 is a photograph illustrating the state of pores formed on the surface of the elastic layer of a conductive roller of Example 1.
Figure 5:
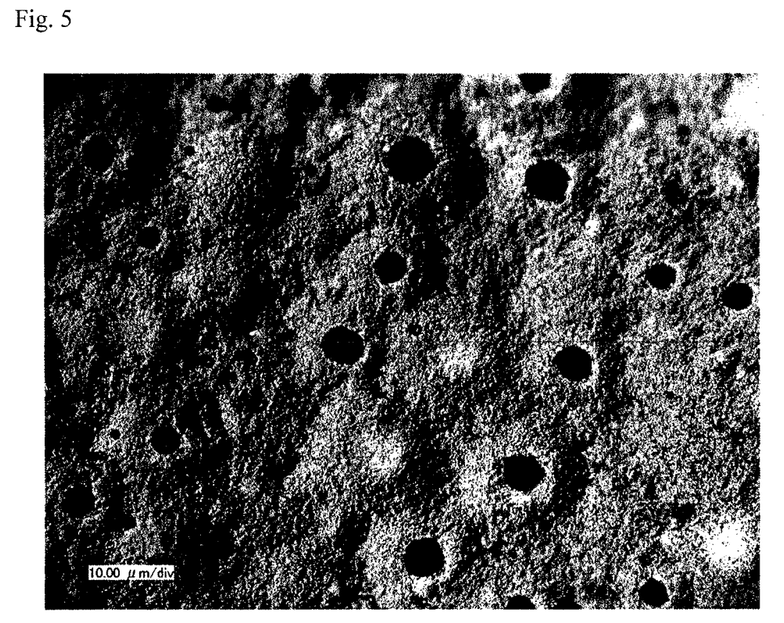
FIG. 5 is a photograph illustrating the state of pores formed on the surface of the elastic layer of a conductive roller of Example 2.
Figure 6:
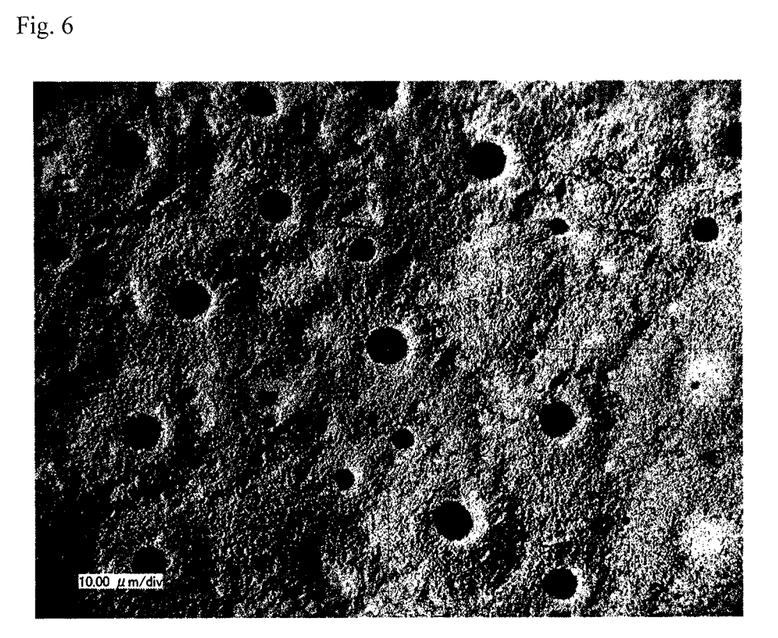
FIG. 6 is a photograph illustrating the state of pores formed on the surface of the elastic layer of a conductive roller of Example 3.
Figure 10:
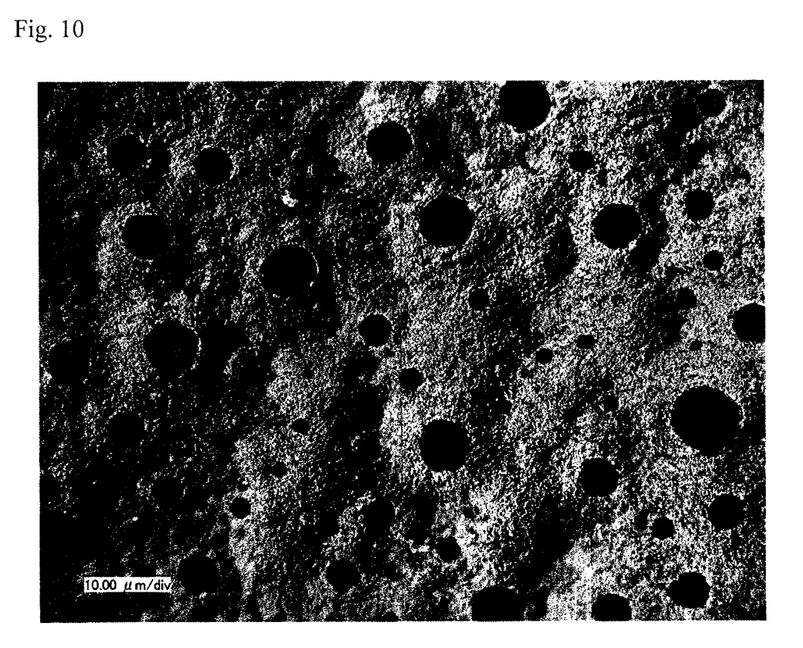
FIG. 10 is a photograph illustrating the state of pores formed on the surface of the elastic layer of a conductive roller of Comparative Example 1.

|  |  | Comparative Example 1 | Example 1 | Example 2 | Example 3 |
|---|---|---|---|---|---|
| Elastic layer formulation (parts by mass) | Polyurethane resin[*1] | 100 | 100 | 100 | 100 |
|  | Foaming agent[*2] | 16 | 16 | 16 | 16 |
|  | Wetting agent[*3] | 0.5 | 0.5 | 0.5 | 0.5 |
|  | Conductive agent[*4] | 4 | 4 | 4 | 4 |
|  | Foam stabilizer[*5] | 6 | 6 | 6 | 6 |
|  | Curing agent[*6] | 20 | 20 | 20 | 20 |
|  | Waterproofing agent[*7] | 0 | 0.5 | 1 | 3 |
| Specific gravity of coating (g/mL) |  | 0.48 | 0.46 | 0.48 | 0.43 |
| Elastic layer thickness (mm) |  | 0.7 | 0.7 | 0.7 | 0.7 |
| Resistance (Ω) | Normal temperature and normal humidity environment | 4.0E+04 | 2.0E+03 | 1.5E+03 | 1.3E+03 |
|  | Low temperature and low humidity environment | 6.0E+04 | 2.6E+03 | 1.8E+03 | 1.4E+03 |
|  | High temperature and high humidity environment | 1.4E+04 | 1.1E+03 | 1.1E+03 | 1.2E+03 |
| Reaction width (%) |  | 314 | 132 | 64 | 19 |
| Elastic layer average pore size (μm) |  | 53 | 50 | 38 | 35 |
| Elastic layer surface photograph (corresponding figure) |  | FIG. 10 | FIG. 4 | FIG. 5 | FIG. 6 |

[*1] urethane resin: ADEKA BONTIGHTER HUX-950 (manufactured by ADEKA Co., Ltd.)
[*2] foaming agent: NOPCO DC-100-A (manufactured by SAN NOPCO LIMITED)
[*3] wetting agent: SN-WET 980 (manufactured by SAN NOPCO LIMITED)
[*4] conductive agent: BSYD14971 (manufactured by MIKUNI COLOR LTD.)
[*5] foam stabilizer: NEOGEN S-20D (manufactured by DAI-ICHI KOGYO SEIYAKU CO., LTD.)
[*6] curing agent: ADEKA BONTIGHTER HUX-SW (manufactured by ADEKA Co., Ltd.)
[*7] waterproofing agent: AZ Coat 5800MT (manufactured by SAN NOPCO LIMITED)

TABLE 2

Figure 7:
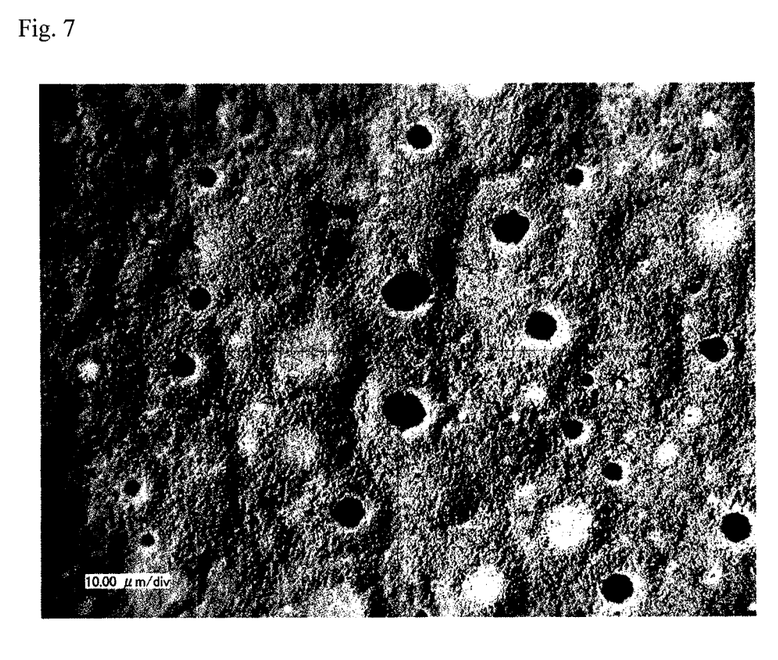
FIG. 7 is a photograph illustrating the state of pores formed on the surface of the elastic layer of a conductive roller of Example 4.
Figure 8:
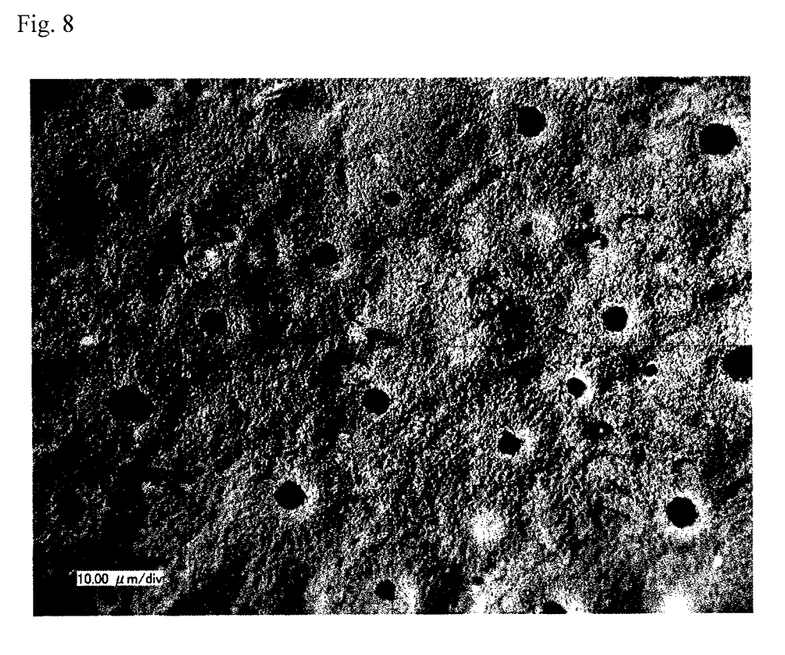
FIG. 8 is a photograph illustrating the state of pores formed on the surface of the elastic layer of a conductive roller of Example 5.
Figure 9:
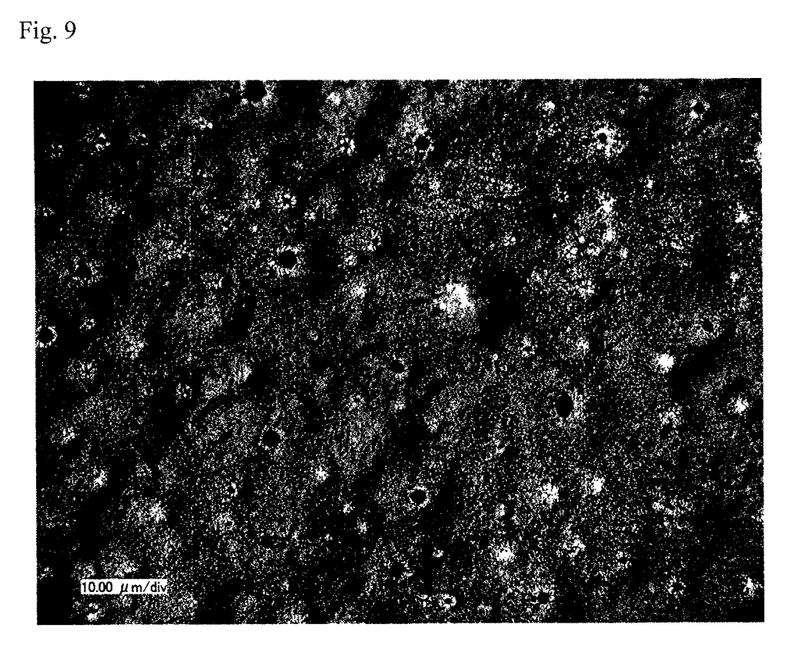
FIG. 9 is a photograph illustrating the state of pores formed on the surface of the elastic layer of a conductive roller of Example 6.

|  |  | Example 4 | Example 5 | Example 6 | Example 7 |
|---|---|---|---|---|---|
| Elastic layer formulation (parts by mass) | Polyurethane resin*1 | 100 | 100 | 100 | 100 |
|  | Foaming agent*2 | 16 | 16 | 16 | 16 |
|  | Wetting agent*3 | 0.5 | 0.5 | 0.5 | 0.5 |
|  | Conductive agent*4 | 4 | 4 | 4 | 4 |
|  | Foam stabilizer*5 | 6 | 6 | 6 | 6 |
|  | Curing agent*6 | 20 | 20 | 20 | 20 |
|  | Waterproofing agent*7 | 5 | 10 | 20 | 1 |
| Specific gravity of coating (g/mL) |  | 0.47 | 0.53 | 0.48 | 0.48 |
| Elastic layer thickness (mm) |  | 0.7 | 0.6 | 0.8 | 1.5 |
| Resistance (Ω) | Normal temperature and normal humidity environment | 1.1E+03 | 1.1E+03 | 1.1E+03 | 2.5E+03 |
|  | Low temperature and low humidity environment | 1.1E+03 | 1.1E+03 | 1.1E+03 | 2.8E+03 |
|  | High temperature and high humidity environment | 1.1E+03 | 1.1E+03 | 1.1E+03 | 2.3E+03 |
|  | Reaction width (%) | 0.2 | 0.2 | 0.5 | 22 |
| Elastic layer average pore size (μm) |  | 23 | 15 | 10 | 41 |
| Elastic layer surface photograph (corresponding figure) |  | FIG. 7 | FIG. 8 | FIG. 9 | — |

As illustrated in the above-described Tables, the rollers of the Examples in which the polyurethane resin and the waterproofing agent were contained in the elastic layer formulation had a controlled environment-dependence of the resistance and had a small variation of the resistance accompanied by environmental change as compared to the roller of the Comparative Example 1 in which the waterproofing agent was not contained. As illustrated in the above Tables and in the Figures, it was confirmed that the rollers in the Examples had a fine pore size at the surface of the elastic layer as compared to the roller of the Comparative Example 1.

DESCRIPTION OF SYMBOLS

1 SHAFT
2 ELASTIC LAYER
3 SURFACE LAYER
4 ADHESION LAYER
5 RESISTANCE ADJUSTING LAYER
10, 20, 30 CONDUCTIVE ROLLER

The invention claimed is:

1. A conductive roller comprising a shaft, an elastic layer on the periphery of the shaft, and a surface layer on the elastic layer on the periphery of the shaft, wherein
the elastic layer is composed of a polyurethane foam containing a polyurethane resin and a waterproofing agent,
the waterproofing agent is ammonium zirconium carbonate, and
the polyurethane foam is formed by foaming materials comprising the polyurethane resin and the ammonium zirconium carbonate.

2. The conductive roller according to claim 1, wherein the polyurethane foam contains 0.5 to 20 parts by mass of the waterproofing agent with respect to 100 parts by mass of the polyurethane resin.

3. The conductive roller according to claim 1, wherein the conductive roller is a charging roller.

4. A manufacturing method of a conductive roller, comprising:
providing a shaft,
providing an elastic layer on a periphery of the shaft, and
providing a surface layer on the elastic layer on the periphery of the shaft,
wherein the elastic layer is composed of a polyurethane foam formed by foaming materials comprising a polyurethane resin and a waterproofing agent,
wherein the waterproofing agent is ammonium zirconium carbonate, and
wherein the method further comprises:
foaming materials comprising the polyurethane resin and the ammonium zirconium carbonate to form foamed materials, and
applying the foamed materials to the shaft by dipping coating to form the elastic layer on the periphery of the shaft.

* * * * *